(12) United States Patent
Zhang et al.

(10) Patent No.: US 12,182,524 B2
(45) Date of Patent: Dec. 31, 2024

(54) INTENT DETECTION

(71) Applicant: ADOBE INC., San Jose, CA (US)

(72) Inventors: Jianguo Zhang, Chicago, IL (US);
Trung Huu Bui, San Jose, CA (US);
Seunghyun Yoon, San Jose, CA (US);
Xiang Chen, Palo Alto, CA (US);
Quan Hung Tran, San Jose, CA (US);
Walter W. Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 443 days.

(21) Appl. No.: 17/453,562

(22) Filed: Nov. 4, 2021

(65) Prior Publication Data

US 2023/0136527 A1    May 4, 2023

(51) Int. Cl.
*G06F 40/40* (2020.01)
*G06F 40/284* (2020.01)
*G06F 40/30* (2020.01)
*G06V 30/19* (2022.01)

(52) U.S. Cl.
CPC ............ *G06F 40/40* (2020.01); *G06F 40/284* (2020.01); *G06F 40/30* (2020.01); *G06V 30/19147* (2022.01)

(58) Field of Classification Search
USPC .............................................. 704/7–10, 256
See application file for complete search history.

(56) References Cited

U.S. PATENT DOCUMENTS

| | | | |
|---|---|---|---|
| 2021/0374603 A1* | 12/2021 | Xia | G06N 3/045 |
| 2022/0139384 A1* | 5/2022 | Wu | G06F 40/35 |
| | | | 704/257 |
| 2022/0237368 A1* | 7/2022 | Tran | G06N 20/00 |
| 2023/0245654 A1* | 8/2023 | Shrivastava | G10L 15/1822 |
| | | | 704/243 |
| 2023/0376700 A1* | 11/2023 | Bista | G06F 40/284 |

OTHER PUBLICATIONS

Devlin, et al., "BERT: Pre-training of Deep Bidirectional Transformers for Language Understanding", arXiv preprint arXiv:1810.04805v2 [cs.CL] May 24, 2019, 16 pages.

Gunel, et al., "Supervised Contrastive Learning for Pre-Trained Language Model Fine-Tuning", arXiv preprint arXiv:2011.01403v3 [cs.CL] Apr. 2, 2021, pp. 1-15.

(Continued)

*Primary Examiner* — Leonard Saint-Cyr
(74) *Attorney, Agent, or Firm* — F. CHAU & ASSOCIATES, LLC

(57) ABSTRACT

Systems and methods for natural language processing are described. One or more aspects of a method, apparatus, and non-transitory computer readable medium include receiving a text phrase; encoding the text phrase using an encoder to obtain a hidden representation of the text phrase, wherein the encoder is trained during a first training phrase using self-supervised learning based on a first contrastive loss and during a second training phrase using supervised learning based on a second contrastive learning loss; identifying an intent of the text phrase from a predetermined set of intent labels using a classification network, wherein the classification network is jointly trained with the encoder in the second training phase; and generating a response to the text phrase based on the intent.

20 Claims, 7 Drawing Sheets

(56) References Cited

OTHER PUBLICATIONS

Coucke, et al., "Snips Voice Platform: an embedded Spoken Language Understanding system for private-by-design voice interfaces", arXiv preprint arXiv:1805.10190v3 [cs.CL] Dec. 6, 2018, 29 pages.
Gao, et al., "SimCSE: Simple Contrastive Learning of Sentence Embeddings", arXiv preprint arXiv:2104.08821v3 [cs.CL] Sep. 9, 2021, 17 pages.
Kingma, et al., "Auto-Encoding Variational Bayes", arXiv preprint arXiv:1312.6114v10 [stat.ML] May 1, 2014, pp. 1-14.
Liu, et al., "Fast, Effective, and Self-Supervised: Transforming Masked Language Models into Universal Lexical and Sentence Encoders", arXiv preprint arXiv:2104.08027v2 [cs.CL] Sep. 9, 2021, 18 pages.
Liu, et al., "Benchmarking Natural Language Understanding Services for building Conversational Agents", arXiv preprint arXiv:1903.05566v3 [cs.CL] Mar. 26, 2019, 13 pages.
Mehri, et al., DialoGLUE: A Natural Language Understanding Benchmark for Task-Oriented Dialogue:, arXiv preprint arXiv:2009.13570v2 [cs.CL] Oct. 11, 2020, 9 pages.
Mehri, et al., "Example-Driven Intent Prediction with Observers", arXiv preprint arXiv:2010.08684v2 [cs.CL] May 25, 2021, 14 pages.
Peng, et al., "Data Augmentation for Spoken Language Understanding via Pretrained Language Models", arXiv preprint arXiv:2004.13952v2 [cs.CL] Mar. 11, 2021, 5 pages.
Xia, et al., "CG-BERT: Conditional Text Generation with BERT for Generalized Few-shot Intent Detection", arXiv preprint arXiv:2004.01881v1 [cs.CL] Apr. 4, 2020, 11 pages.

\* cited by examiner

INTENT DETECTION

BACKGROUND

The following relates generally to natural language processing, and more specifically to intent detection.

Natural language processing (NLP) refers to using computers to interpret or generate natural language. In some cases, NLP tasks involve assigning label data such as grammatical information to words or phrases within a natural language expression. Some NLP algorithms, such as decision trees, utilize hard if-then rules. Other systems use neural networks or statistical models which make soft, probabilistic decisions based on attaching real-valued weights to input features. These models can express the relative probability of multiple answers. A variety of different classes of machine-learning algorithms have been applied to NLP tasks.

Intent detection is a subset of task-oriented dialog systems in NLP that attempts to identify intent from user utterances. For example, a user of photo editing software may type a phrase such as "help me crop the photo", and a an intent detection system may try to determine that the user intends to crop a photo and wants assistance in accomplishing the task (such as being presented with a helper tool, an indication of a relevant icon or menu to click on, etc.).

However, conventional intent detection systems require a large body of training examples to be effective, which is costly and computationally expensive. In some cases, an adequately large body of training examples does not exist. Additionally, in some situations, conventional intent detection systems cannot be adequately trained as they only have access to examples that are too fine-grained and semantically similar to each other, which can result in models with inaccurate performance or that require costly and time consuming data annotation. Therefore, there is a need in the art for NLP systems that can be trained to recognize finely differentiated intents without using a large body of training examples.

SUMMARY

The present disclosure describes systems and methods for natural language processing that can accurately identify the intent of user utterances by training one or more neural networks on training examples via a two-stage contrastive pre-training and fine-tuning learning process. In some embodiments, these training examples are limited in number and/or semantically similar.

A method, apparatus, and non-transitory computer readable medium for natural language processing are described. One or more aspects of the method, apparatus, and non-transitory computer readable medium include receiving a text phrase; encoding the text phrase using an encoder to obtain a hidden representation of the text phrase, wherein the encoder is trained during a first training phrase using self-supervised learning based on a first contrastive loss and during a second training phrase using supervised learning based on a second contrastive teaming loss; identifying an intent of the text phrase from a predetermined set of intent labels using a classification network based on the hidden representation, wherein the classification network is jointly trained with the encoder in the second training phase; and generating a response to the text phrase based on the intent.

A method, apparatus, and non-transitory computer readable medium for natural language processing are described. One or more aspects of the method, apparatus, and non-transitory computer readable medium include modifying at least one token of a text phrase to obtain a modified text phrase; encoding the text phrase and the modified text phrase using an encoder to obtain a hidden representation of the text phrase and a modified hidden representation of the modified text phrase; training the encoder in a first training phase using a first contrastive learning loss based on an unlabeled positive sample pair including the hidden representation and the modified hidden representation; and training the encoder in a second training phase using a second contrastive learning loss based on a labeled positive sample pair including a first labeled hidden representation having a ground truth label and a second labeled hidden representation having the same ground truth label.

An apparatus and method for natural language processing are described. One or more aspects of the apparatus and method include an encoder configured to encode a text phrase to obtain a hidden representation; a classification network configured to predict a label for the text phrase network based on the hidden representation; a pre-training component configured to train the encoder in a first training phase using a first contrastive learning loss that uses an unlabeled positive sample pair including the hidden representation and a modified hidden representation; and a fine-tuning component configured to train the encoder using a second contrastive learning loss that uses a labeled positive sample pair including a first labeled hidden representation with a ground truth label and a second labeled hidden representation having the same ground truth label.

DETAILED DESCRIPTION

Figure 1:
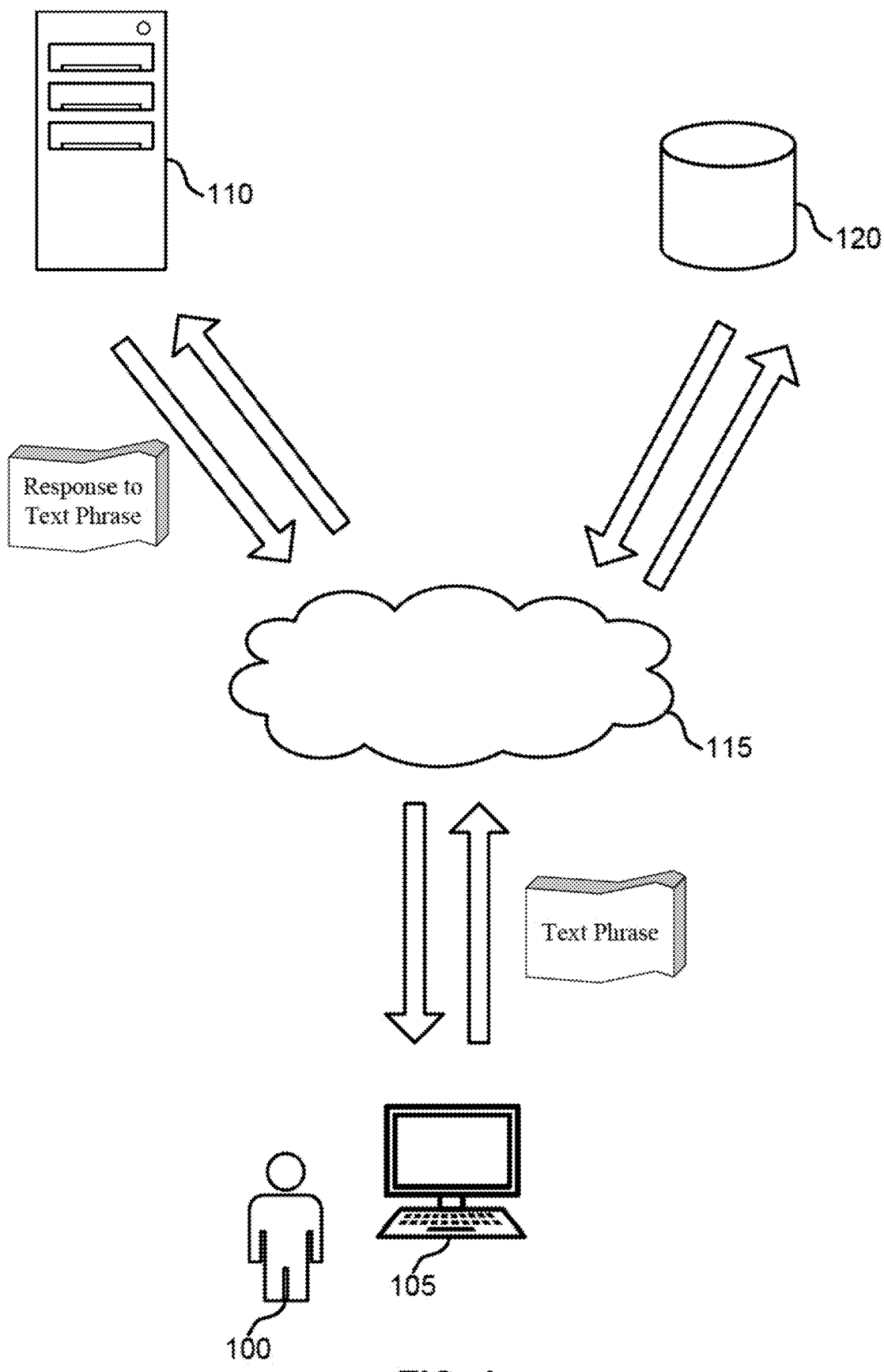
FIG. 1 shows an example of a natural language processing system diagram according to aspects of the present disclosure.

The present disclosure describes systems and methods for natural language processing that can accurately identify the intent of user utterances. Examples embodiments perform intent recognition by training one or more neural networks on training examples via a two-stage pre-training and fine-tuning learning process. Contrastive learning methods can be used in both training phases. In some embodiments, these training examples are limited in number or semantically similar. Some embodiments of the disclosure encode a received text phrase and identify an intent of the encoded text phrase to generate a response to the text phrase. In some embodiments, a contrastive pre-learning component can train a neural network to discriminate semantically similar utterances in a training dataset without using any labeled examples. In some embodiments, a fine-tuning component can train at least one neural network by more closely grouping the training dataset based on the semantic similarity in the phrases present in the training dataset.

Natural language processing (NLP) systems are computer systems that interpret or generate natural language. Intent detection systems, a subset of NLP systems, learn to detect user intent in user utterances by being trained on one or more training datasets. Conventional intent detection systems are limited by the size of the available training datasets (for example, they are too large and computationally expensive to train on, or they are not large enough to provide satisfactory training results), or by the semantic similarity of the training phrases in the available training datasets, which do not allow the conventional systems to be adequately trained to be accurately responsive to a user utterance.

An embodiment of the present disclosure includes a technologically advantageous encoder, classification network, and training unit that enables the encoder and the classification network to be trained on small datasets containing semantically similar phrases.

By employing an unconventional two-stage training unit including a self-supervised pre-training component and a supervised fine-tuning component, the few-shot intent detection systems and methods described by the present disclosure are able to more accurately process available "few-shot" datasets (i.e., datasets that include a small amount of training examples per actual user intent) than conventional intent detection systems, thereby providing a user with helpful response to a user utterance that accurately understands the intent of the utterance.

Some embodiments of the present disclosure include an encoder, a classification network, and a training unit that includes a pre-training component and a fine-tuning component. The encoder can receive a text phrase. The encoder can encode the text phrase to obtain a hidden representation of the text phrase. The encoder may be trained by the pre-training component during a first self-supervised pre-training stage. The classification network can identify an intent of the text phrase. The encoder and the classification network can be jointly trained in a second supervised fine-tuning stage. The classification network can generate a response to the text phrase based on the identified intent.

Embodiments of the present disclosure may be used in the context of natural language processing. For example, a system or method based on the present disclosure may be used to accurately respond to a user utterance. An example application in the natural language processing context is provided with reference to FIGS. 1-2. Details regarding the architecture of an example intent detection apparatus is provided with reference to FIG. 3. Examples of a process for natural language processing is provided with reference to FIGS. 4-7.

Intent Detection

FIG. 1 shows an example of a few-shot intent detection system diagram according to aspects of the present disclosure. The example shown includes user 100, user device 105, intent detection apparatus 110, cloud 115, and database 120. Intent detection apparatus 110 is an example of, or includes aspects of, the corresponding element described with reference to FIGS. 2-3.

Intent detection systems are an example of task-oriented dialog systems that attempt to identify intents from user utterances. Identification of user intents is used for downstream tasks in computer-based systems. For example, Amazon® Alexa attempts to identify user intents for the purpose of downstream tasks. For another example. Adobe® Photoshop users may type key search words for cropping a photo, and a system attempts to identify the user intents underlying the search words (e.g., crop the photo) and provide tools or editions that correspond to the intent. However, user interaction data does not include sufficient training examples for novel intents, and datasets available for training such intent detection systems are scarce, as the annotation of sufficient examples for emerging intents is expensive. Additionally, in some cases, multiple user intents are fine-grained and semantically similar, and conventional intent detection systems do not accurately identify of intents in fine-grained few-shot learning.

Conventional intent detection systems perform few-shot intent detection tasks from the two perspectives of data augmentation and task-adaptive training with pre-trained models. In some comparative examples, data augmentation techniques include a nearest neighbor classification schema that uses limited training examples in training and inference stages. Alternatively, in some comparative examples, user utterances are generated for emerging intents based on a variational autoencoder and transformer model (e.g., GPT-2). In some comparative task-adaptive training with pre-trained model examples, intent detection is conducted using related conversational pre-training models based on datasets including conversations that number in the millions. In other comparative examples, a task-adaptive training schema is devised in which a model is pre-trained on relative intent datasets or the target intent datasets with mask language modeling.

However, conventional intent detection systems that use methods such as data augmentation and related models are costly for training and include scalability issues in use cases of tasks with multiple intents. Additionally, these models are not capable of few-shot intent detection in real scenarios for fine-grained and semantically similar intents. For example, a real training scenario may include the use of a fine-grained intent dataset (i.e., BANKING77) with a single domain of 77 intents, or another dataset (i.e., CLINC150) with ten domains of 150 intents. In some cases, multiple intents in the datasets may be semantically similar. Therefore, conventional intent detection systems may not adequately train these models, given the limited available training examples.

The intent detection system of FIG. 1 provides few-shot intent detection using contrastive learning in self-supervised pre-training and supervised fine-tuning stages. In some embodiments, the intent detection system implicitly discriminates semantically similar utterances using contrastive self-supervised pre-training on intent datasets. In some embodiments, the intent detection system performs contrastive self-supervised pre-training without using intent labels. In some embodiments, the intent detection system then jointly performs few-shot intent detection and supervised contrastive learning. This supervised contrastive learning explicitly teams to bring together utterances from a same intent and separate utterances across different intents. Accordingly, the intent detection system can accurately identify user intents and generate appropriate responses to user utterances even when the datasets available for training the intent detection system are small and contain semantically similar examples.

In the example of FIG. 1, one or more users 100 may provide a user utterance to a user device 105 (for example, via hardware such as a keyboard, touchscreen, microphone, etc., and/or software such as a graphical user interface, a virtual keyboard, etc.). The user device 105 may be a personal computer, laptop computer, mainframe computer, palmtop computer, personal assistant, mobile device, or any other suitable processing apparatus. In some examples, the user device 105 includes software that can process a user utterance, communicate the user utterance to the intent detection apparatus 110, cloud 115, and/or database 120, and receive a generated response to the user utterance.

Intent detection apparatus 110 may include a computer implemented network comprising a training unit, a modification component, an encoder, and a classification network. Intent detection apparatus 110 may also include a processor unit, a memory unit, and an I/O controller. Additionally, intent detection apparatus 110 can communicate with the user device 105 and the database 120 via the cloud 115.

In some cases, intent detection apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some cases, intent detection apparatus 110 provides responses to user utterances via an encoder and classification network that is trained via self-supervised contrastive pre-training and supervised fine-tuning using fine-grained and semantically similar intents. In one or more embodiments of the disclosure, intent detection apparatus 110 conducts self-supervised contrastive pre-training on collected intent datasets and implicitly learns to discriminate semantically similar utterances without using labels. In one or more embodiments of the disclosure, intent detection apparatus 110 performs few-shot intent detection with supervised contrastive learning, which explicitly brings together utterances from a same intent and separates utterances across different intents. According to some aspects, intent detection apparatus 110 performs a process that achieves advanced performance on intent detection datasets under five-shot and ten-shot settings.

Figure 3:
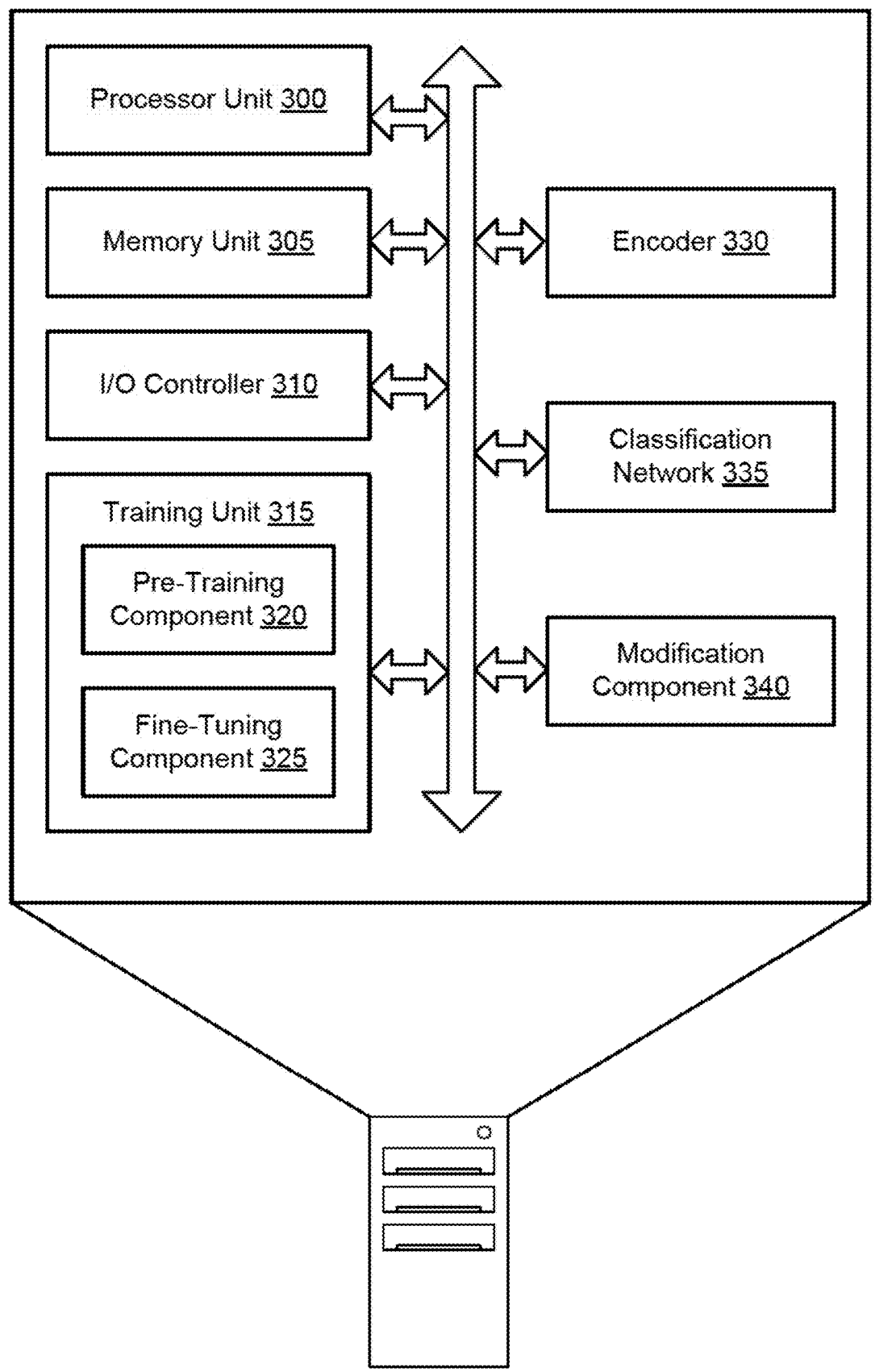
FIG. 3 shows an example of an intent detection apparatus according to aspects of the present disclosure.

Further detail regarding the architecture of the intent detection apparatus 110 is provided with reference to FIG. 3. Further detail regarding a process for intent detection is provided with reference to FIGS. 4-5. Further detail regarding a process for training a neural network such as an encoder described by the present disclosure is provided with reference to FIGS. 6-7.

A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data such as training data for training an intent detection model in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction. In some cases, database 120 may be external to intent detection apparatus 110. In some cases, database 120 may be included in intent detection apparatus 110.

Figure 2:
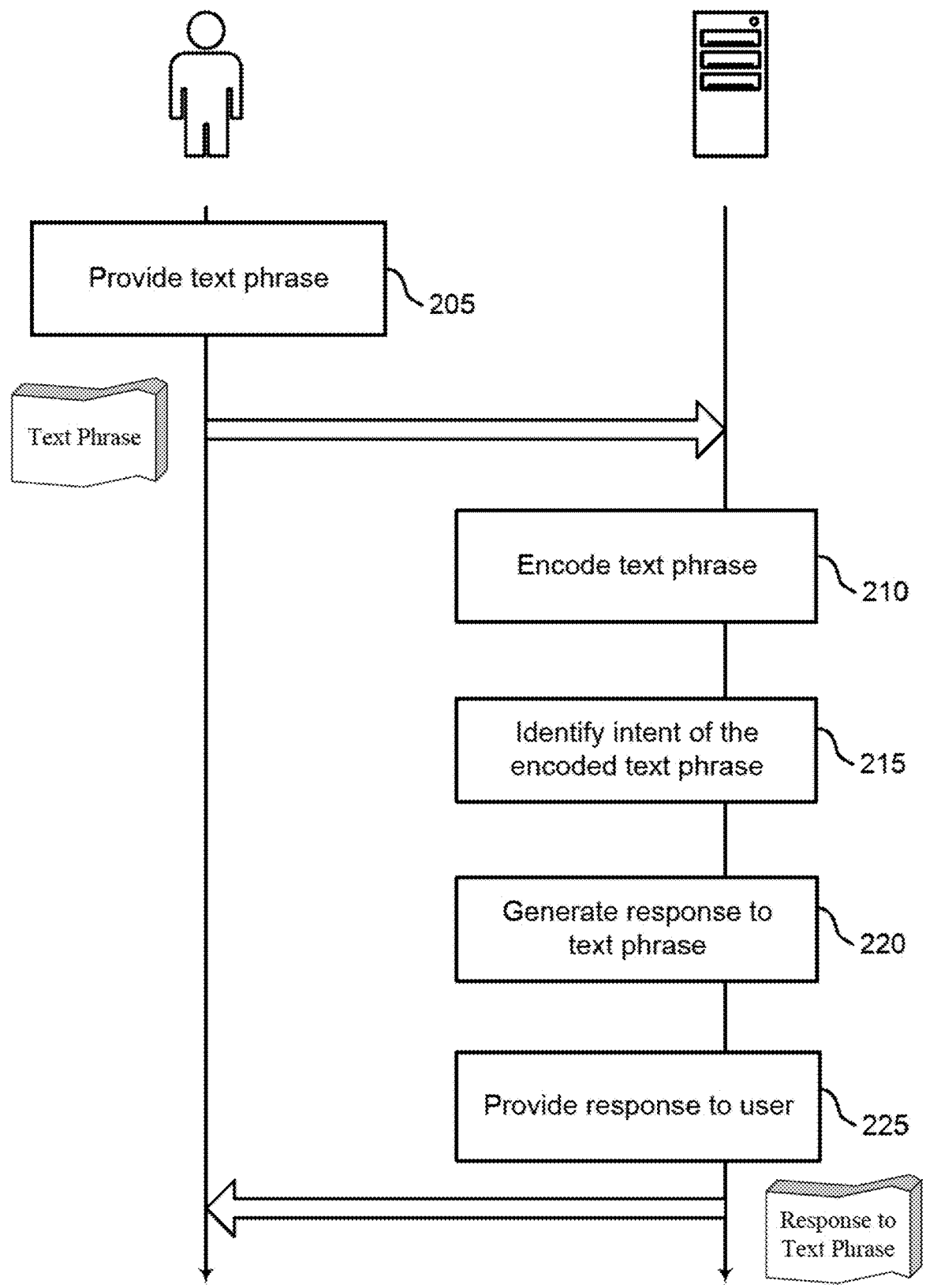
FIG. 2 shows an example of a process for natural language processing according to aspects of the present disclosure.

FIG. 2 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system provides a text phrase. In some cases, the operations of this step refer to, or may be performed by, a user as described with reference to FIG. 1. For example, a user can input a user utterance to a user device via hardware such a keyboard, mouse, touchscreen, microphone, etc., and/or software such as a graphical user interface, virtual keyboard, etc. For example, a user may be operating software on the user device, and may input an utterance into a prompt, text box, pop-up, etc. For example, the user may input an utterance such as "help me crop this photo" into photo-editing software.

At operation 210, the system encodes the text phrase. In some cases, the operations of this step refer to, or may be performed by, a server as described with reference to FIG. 1. For example, the server can encode the text phrase using an encoder to obtain a hidden representation of the text phrase. In some embodiments, the encoder is trained during a first training phrase using self-supervised learning based on a first contrastive loss and during a second training phrase using supervised learning based on a second contrastive learning loss.

At operation 215, the system identifies intent of the encoded text phrase. In some cases, the operations of this step refer to, or may be performed by, a server as described with reference to FIG. 1. For example, the server can identify an intent of the text phrase from a predetermined set of intent labels using a classification network. In some examples, the classification network is jointly trained with the encoder in the second training phase.

At operation 220, the system generates response to text phrase. In some cases, the operations of this step refer to, or may be performed by, a server as described with reference to FIG. 1. For example, once the server has identified an intent of the text phrase, the server can generate an intent-accurate response. For example, after identifying the intent of the example utterance "help me to crop this photo", the server can generate a response that instructs the photo-editing software to provide an appropriate prompt to a user that intends to crop a photograph.

At operation 225, the system provides the response to user. In some cases, the operations of this step refer to, or may be performed by, a server as described with reference to FIG. 1. For example, the server can instruct the user device to display, via a display and the example photo-editing software, the example appropriate prompt relating to cropping a photo in the software.

Architecture

In FIG. 3, an apparatus for intent detection is described. One or more aspects of the apparatus include an encoder configured to encode a text phrase to obtain a hidden representation; a classification network configured to predict a label for the text phrase network based on the hidden representation; a pre-training component configured to train the encoder in a first training phase using a first contrastive learning loss that uses an unlabeled positive sample pair including the hidden representation and a modified hidden representation; and a fine-tuning component configured to train the encoder using a second contrastive learning loss that uses a labeled positive sample pair including a first labeled hidden representation with a ground truth label and a second labeled hidden representation having the same ground truth label.

Some examples of the apparatus further include a modification component configured to mask at least one token of the text phrase to produce a modified text phrase, where in the modified hidden representation is based on the modified text phrase. The term "token" refers to a discrete unit of characters in an NLP task.

In some aspects, the pre-training component is configured to compute a probability of each modified token of the modified text phrase over a total vocabulary, and to compute a language modeling loss based on the probability, wherein the encoder is trained based on the language modeling loss in the first training phase.

In some aspects, the fine-tuning component is configured to identify labeled positive sample pairs and a labeled negative sample pairs corresponding to each sample of a training batch. In some aspects, the fine-tuning component is configured to compute a prediction loss by comparing the predicted label to a ground truth label. In some aspects, the encoder is based on a pre-trained Bidirectional Encoder Representations from Transformers (BERT) model.

FIG. 3 shows an example of an intent detection apparatus according to aspects of the present disclosure. The example shown includes processor unit 300, memory unit 305, I/O controller 310, training unit 315, encoder 330, classification network 335, and modification component 340. The intent detection apparatus shown in FIG. 3 is an example of, or includes aspects of, the server described with reference to FIGS. 1-2.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 device include random access memory (RAM), read-only memory (ROM), or a hard disk. Examples of memory unit 305 devices include solid state memory and a hard disk drive. In some examples, memory is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory unit 305 controller operates memory cells. For example, the memory unit 305 controller can include a row decoder, column decoder, or both. In some cases, memory cells within a memory unit 305 store information in the form of a logical state.

I/O controller 310 manages input and output signals for the intent detection apparatus. I/O controller 310 can also manage peripherals not integrated into the intent detection device. In some cases, I/O controller 310 represents a physical connection or port to an external peripheral. In some cases, I/O controller 310 uses an operating system such as iOS®, ANDROID®, MS-DOS®, MS-WINDOWS®, OS/2®, UNIX®, LINUX®, or another known operating system. In other cases, I/O controller 310 represents or interacts with a modem, a keyboard, a mouse, a touchscreen, or a similar device. In some cases, I/O controller 310 can be implemented as part of processor unit 300. In some cases, a user can interact with the intent detection apparatus via I/O controller 310 or via hardware components controlled by I/O controller 310.

According to some aspects. I/O controller 310 receives an audio input. In some examples, I/O controller 310 verbally plays a response to the user in response to receiving the audio input.

According to some aspects, training unit 315 employs a two stage contrastive pre-training and fine-tuning framework (CPT) by training encoder 330 during the first contrastive pre-training stage and encoder 330 and/or classification network 335 during the second fine-tuning training stage. One or more embodiments of the disclosure implicitly discriminate semantically similar utterances using contrastive self-supervised pre-training on intent datasets without using any intent labels in the first training stage. Few-shot intent detection and supervised contrastive learning can be jointly performed in the second training stage. The supervised contrastive learning stage helps a neural network such as encoder 330 and classification network 335 to explicitly learn to bring together utterances from a same intent and separate utterances across different intents.

Self-supervised learning is a form of unsupervised learning. Unsupervised learning is one of three basic machine learning paradigms, alongside supervised learning and reinforcement learning. Unsupervised learning may be used to find hidden patterns or grouping in data. For example, cluster analysis is a form of unsupervised learning. Clusters may be identified using measures of similarity such as Euclidean or probabilistic distance. Both self-supervised and unsupervised learning draws inferences from datasets consisting of input data without labeled responses. However, unlike other forms of unsupervised learning, self-supervised learning models can generate positive sample pairs from an existing sample, for example, in a contrastive learning context.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

According to some aspects, training unit 315 includes a pre-training component 320 and a fine-tuning component 325. According to some aspects, pre-training component 320 performs self-supervised pre-training of encoder 330 and fine-tuning component 325 performs supervised fine-tuning of encoder 330 and/or classification network 335. Contrastive pre-training on intent datasets without using labels during the first, pre-training stage provides for discrimination of semantically similar utterances. Additionally, use of supervised contrastive learning during the second, few-shot fine-tuning stage maintains the performance of training unit 315. Further description of a two-stage CPFT process is provided with reference to FIG. 7.

According to some aspects, pre-training component 320 trains the encoder 330 in a first training phase using a first contrastive teaming loss based on an unlabeled positive sample pair including a hidden representation and a modified hidden representation. For example, pre-training component 320 trains a neural network such as encoder 330 to implicitly learn sentence-level utterance understanding and discrimination between semantically similar utterances via a self-supervised contrastive learning process in the first stage of a CPFT process. Additionally, a mask language modeling loss can be used by the pre-training component 320 to increase a token-level utterance understanding. In some cases, datasets consisting of different user intents (for example, CLINC150, BANKING77, HWU64, TOP, SNIPS and ATIS) are collected by training unit 315. According to some aspects, the datasets may be collected from a database, such as database 120 of FIG. 1. According to some aspects, the datasets may be collected from a distributed network, such as cloud 115 of FIG. 1. For example, the CLINC150 dataset contains 23,700 utterances across ten different domains, and a total of 150 intents, while the BANKING77 dataset contains 13.083 utterances with a single banking domain and 77 intents and the HWU64 dataset includes 25.716 utterances with 64 intents over 21 domains. According to some aspects, training unit 315 implements a learning model based on a reference open source natural language processing framework (e.g., HuggingFace).

According to some aspects, pre-training component 320 excludes test sets of the datasets during the pre-training phase and removes utterances that include less than five tokens. Pre-training component 320 pre-trains a neural network such as encoder 330 on the collected and/or processed public datasets. In some cases, pre-training component 320 dynamically masks tokens in the utterances during a batch training pre-training process (i.e., a sentence or utterance and corresponding masked variations are input to encoder 330 during the batch training).

In some examples, pre-training component 320 computes a cosine similarity between the modified hidden representation and the hidden representation, where the first contrastive learning loss is based on the cosine similarity.

According to some aspects, pre-training component 320 is configured to train the encoder 330 in a first training phase using a first contrastive learning loss that uses an unlabeled positive sample pair including the hidden representation and a modified hidden representation. In some aspects, the pre-training component 320 is configured to compute a probability of each modified token of the modified text phrase over a total vocabulary, and to compute a language modeling loss based on the probability, where the encoder 330 is trained based on the language modeling loss in the first training phase. Further description of a process by which pre-training component 320 may pre-train a neural network such as encoder 330 is provided with reference to FIG. 7.

According to some aspects, fine-tuning component 325 trains the encoder 330 and/or the classification network 335 in a second training phase using a second contrastive learning loss based on a labeled positive sample pair including a first labeled hidden representation having a ground truth label and a second labeled hidden representation having the same ground truth label. For example, fine-tuning component 325 may perform supervised fine-tuning when there are limited training examples available to training unit 315 (for example, five and ten examples for an intent). Fine-tuning component 325 uses a supervised contrastive learning method to understand similar user intents. According to some aspects, fine-tuning component 325 trains at least one neural network such as encoder 330 and classification network 335 via a supervised contrastive learning method with an intent classification loss. In some cases, two utterances from a same class are treated by fine-tuning component 325 as a positive pair and two utterances across different classes are treated by fine-tuning component 325 as a negative pair for the purpose of contrastive learning. For example, same utterances could be a positive pair, and the positive pair can be input by training unit 315 to encoder 330 and/or classification network 335.

In some examples, fine-tuning component 325 selects an unlabeled negative sample pair for the first contrastive learning loss during the first training phase, the unlabeled negative sample pair including the hidden representation and an additional hidden representation corresponding to an additional text phrase different from the text phrase.

In some examples, fine-tuning component 325 identifies unlabeled positive sample pairs and an unlabeled negative sample pairs corresponding to each sample in a training batch during the first training phase. In some examples, fine-tuning component 325 computes a probability of each modified token of the modified text phrase over a total vocabulary. In some examples, fine-tuning component 325 computes a language modeling loss based on the probability, where the encoder 330 is trained based on the language modeling loss in the first training phase. In some examples, fine-tuning component 325 computes a prediction loss by comparing the predicted label and a ground truth label, where the encoder 330 and the classification network 335 are jointly trained in the second training phase using the prediction loss and the second contrastive learning loss. For example, a same gradient descent (optimization algorithm) for both the encoder 330 and the classification network 335 is derived from the same loss function using the prediction loss and the second contrastive learning loss.

In some examples, fine-tuning component 325 selects a labeled negative sample pair for the second contrastive learning loss during the second training phase, the labeled negative sample pair including the first labeled hidden representation having the ground truth label and a third labeled hidden representation with a label other than the ground truth label. In some examples, fine-tuning component 325 identifies labeled positive sample pairs and a labeled negative sample pairs corresponding to each sample in a training batch during the second training phase.

According to some aspects, fine-tuning component 325 is configured to train the encoder 330 and/or the classification network 335 using a second contrastive learning loss that uses a labeled positive sample pair including a first labeled hidden representation with a ground truth label and a second labeled hidden representation having the same ground truth label. In some aspects, the fine-tuning component 325 is configured to identify labeled positive sample pairs and a labeled negative sample pairs corresponding to each sample of a training batch. In some aspects, the fine-tuning component 325 is configured to compute a prediction loss by comparing the predicted label to a ground truth label.

Figure 7:
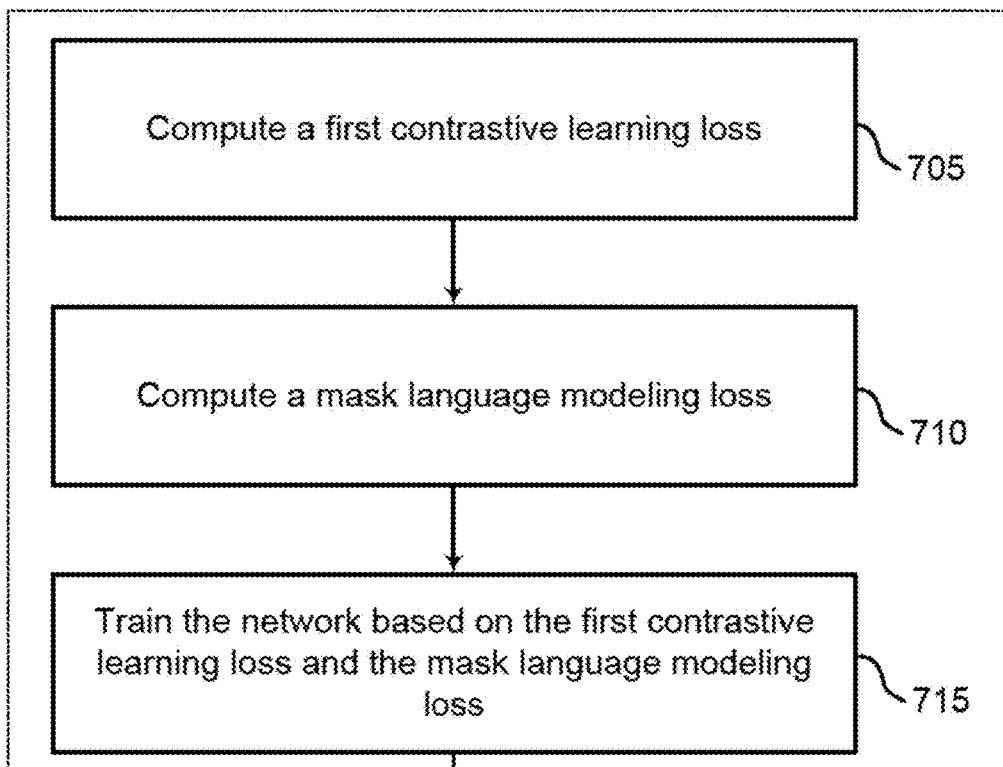
FIG. 7 shows an example of a two-step neural network training method according to aspects of the present disclosure.
Figure 7:
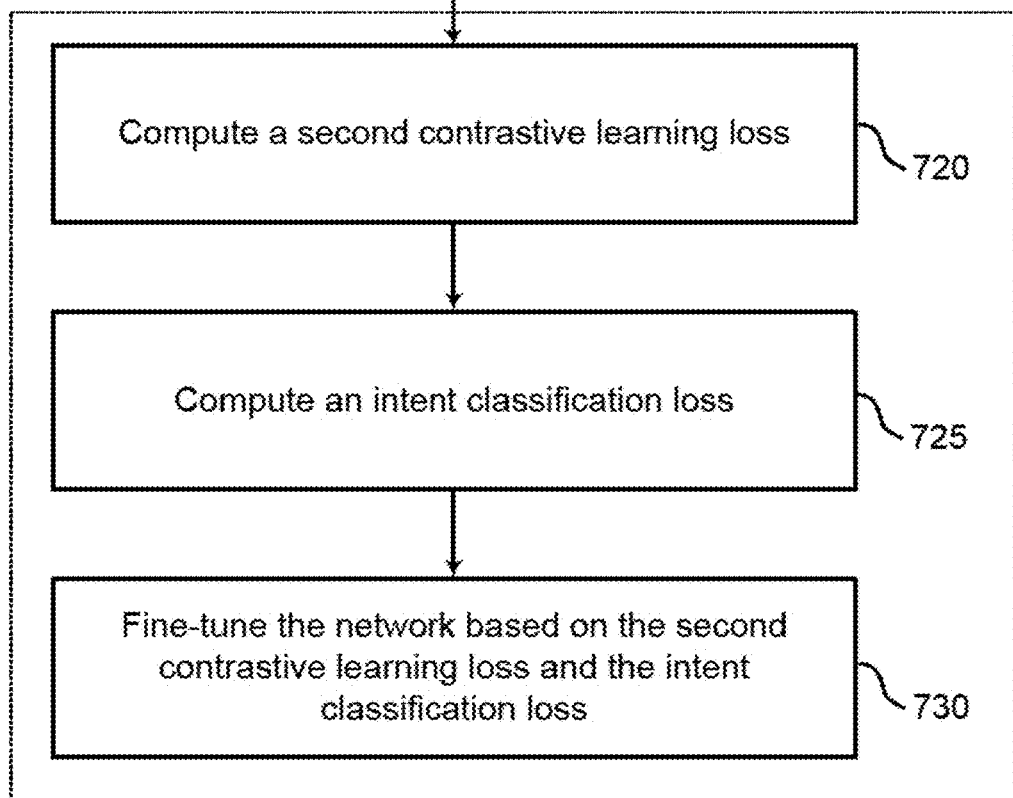

Further description of a process by which fine-tuning component 325 may train at least one neural network such as encoder 330 and classification network 335 is provided with reference to FIG. 7.

According to some aspects, encoder 330 is an artificial neural network. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In neural networks, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and am produced by the output layer. As the neural network's understanding of the input improves as it is trained, the hidden representation is progressively differentiated from earlier iterations.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model am updated accordingly and a new set of predictions are made during the next iteration.

According to some aspects, encoder 330 receives a text phrase. In some examples, encoder 330 encodes the text phrase to obtain a hidden representation of the text phrase. In some examples, encoder 330 converts an audio input received by I/O controller 310 into text to obtain the text phrase.

According to some aspects, encoder 330 encodes the text phrase and/or a modified text phrase received from modification component 340 to obtain a hidden representation of the text phrase and a modified hidden representation of the modified text phrase. In some examples, encoder 330 encodes a set of labeled text phrases to obtain a corresponding labeled hidden representation for each of the labeled text phrases. In some examples, the encoder 330 is trained by the training unit 315 using the CPFT process that includes a first training phrase using self-supervised learning based on a first contrastive loss and a second training phrase using supervised learning based on a second contrastive learning loss.

In some aspects, encoder 330 is based on a pre-trained Bidirectional Encoder Representations from Transformers (BERT) model. According to some aspects, encoder 330 uses a language model with base configuration. For example, RoBERTa with base configuration (i.e., RoBERTa-base) may be used as the BERT model for the encoder. According to some aspects, encoder 330 may be pre-trained on the collected public datasets.

According to some aspects, classification network 335 is an artificial neural network. According to some aspects, classification network 335 identifies an intent of the text phrase from a predetermined set of intent labels. According to some aspects, the classification network 335 is jointly trained with the encoder 330 in the second training phase. In some examples, classification network 335 generates a response to the text phrase based on an identified intent. In some examples, classification network 335 determines that the text phrase includes a request for information based on the intent. In some examples, classification network 335 retrieves the information from a database, such as database 120 of FIG. 1, based on the determination. In some aspects, the predetermined set of intent labels includes a set of semantically similar intent labels.

According to some aspects, classification network 335 predicts a label for each of the labeled text phrases based on the corresponding labeled hidden representation. According to some aspects, classification network 335 is configured to predict a label for the text phrase network based on the hidden representation.

According to some aspects, modification component 340 modifies at least one token of a text phrase to obtain a modified text phrase. In some examples, modifying the at least one token includes randomly masking the at least one token. According to some aspects, modification component 340 is configured to mask at least one token of the text phrase to produce a modified text phrase, where the modified hidden representation is based on the modified text phrase.

Figure 4:
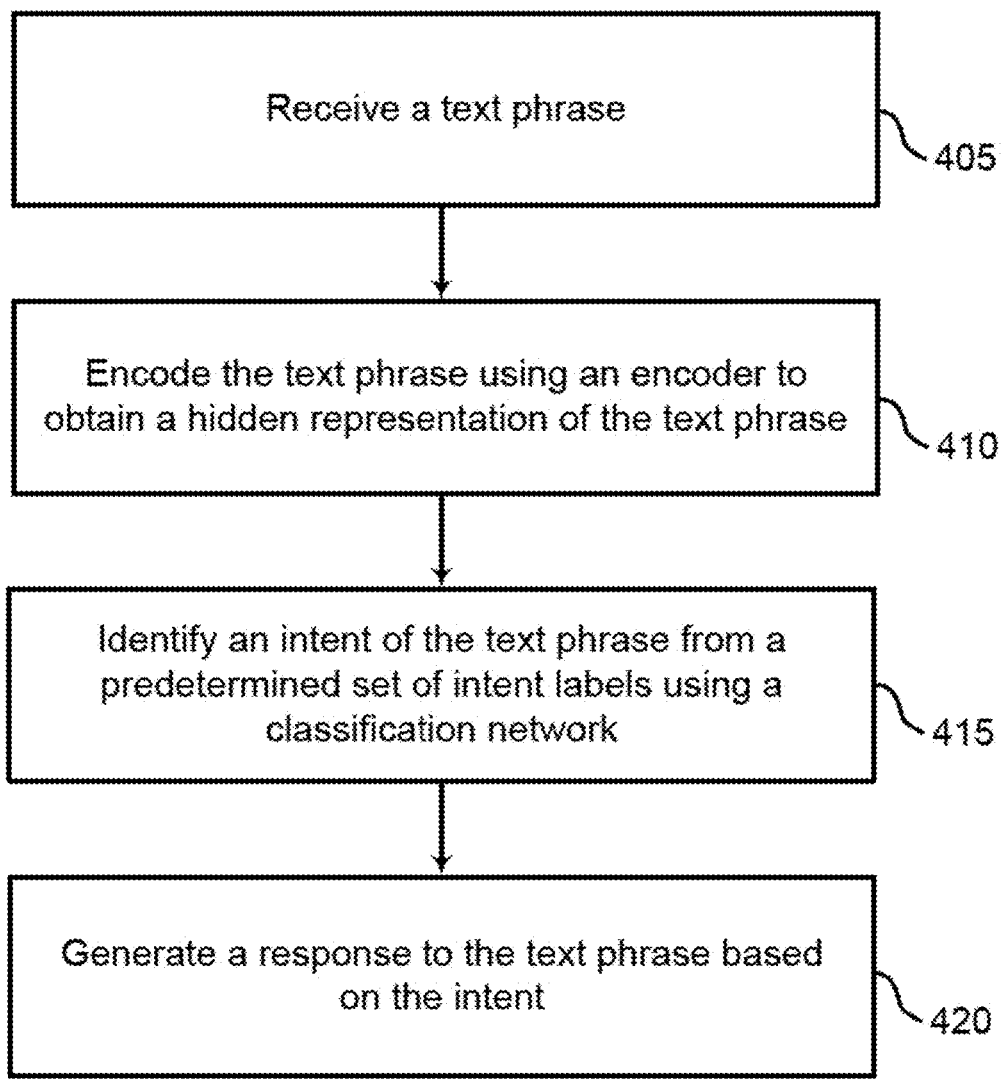
FIG. 4 shows an example of a method for natural language processing according to aspects of the present disclosure.
Figure 5:
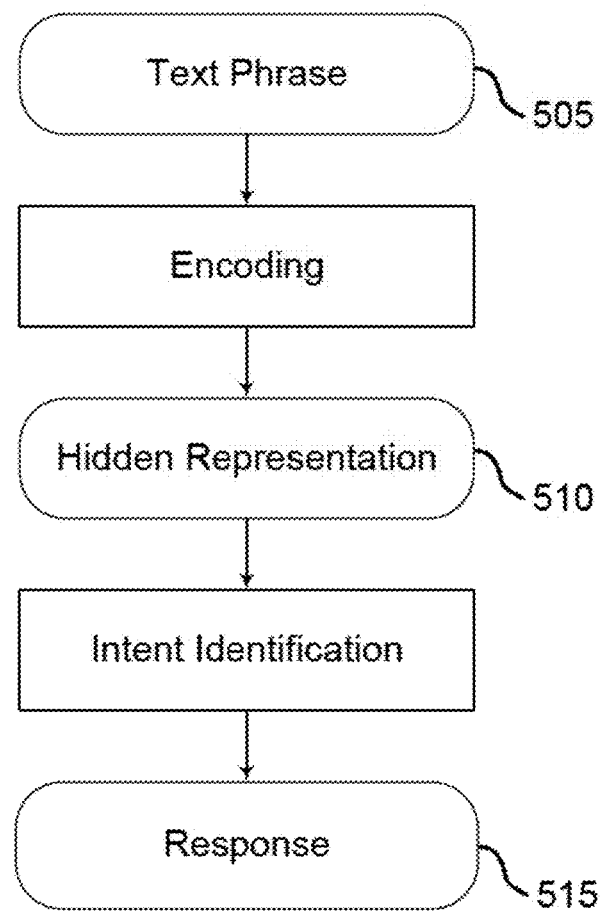
FIG. 5 shows an example of a method for natural language processing according to aspects of the present disclosure.

Further description of a natural language processing process is provided with reference to FIGS. 4-5.

Inference

In FIGS. 4-5, a method for natural language processing is described. One or more aspects of the method include receiving a text phrase; encoding the text phrase using an encoder to obtain a hidden representation of the text phrase, wherein the encoder is trained during a first training phrase using self-supervised learning based on a first contrastive loss and during a second training phrase using supervised learning based on a second contrastive learning loss; identifying an intent of the text phrase from a predetermined set of intent labels using a classification network, wherein the classification network is jointly trained with the encoder in the second training phase; and generating a response to the text phrase based on the intent.

Some examples of the method further include receiving an audio input. Some examples further include converting the audio input into text to obtain the text phrase. Some examples of the method medium further include verbally playing the response to the user in response to receiving the audio input.

Some examples of the method further include determining that the text phrase comprises a request for information based on the intent. Some examples further include retrieving the information from a database based on the determination. In some aspects, the predetermined set of intent labels includes a plurality of semantically similar intent labels.

FIG. 4 shows an example of a method 400 for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system receives a text phrase. In some cases, the operations of this step refer to, or may be performed by, an encoder as described with reference to FIG. 3. In some embodiments, receiving a text phrase may be performed as described with reference to FIGS. 1-3. In some embodiments, an I/O controller as described with reference to FIG. 3 receives a text phrase from a user device and provides the text phrase to the encoder. In some embodiments, the I/O controller receives an audio input, and the encoder converts the audio input to the text phrase.

At operation 410, the system encodes the text phrase using an encoder to obtain a hidden representation of the text phrase. In some cases, the operations of this step refer to, or may be performed by, an encoder as described with reference to FIG. 3. In some embodiments, encoding the text phrase may be performed as described with reference to FIGS. 1-3.

At operation 415, the system identifies an intent of the text phrase from a predetermined set of intent labels using a classification network. In some cases, the operations of this step refer to, or may be performed by, a classification network as described with reference to FIG. 3. In some embodiments, identifying an intent of the text phrase may be performed as described with reference to FIGS. 1-3.

At operation 420, the system generates a response to the text phrase based on the intent. In some cases, the operations of this step refer to, or may be performed by, a classification network as described with reference to FIG. 3. In some embodiments, generating a response to the text phrase may be performed as described with reference to FIGS. 1-3.

FIG. 5 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The system receives a text phrase 505 as an input and outputs a hidden representation 510. In some cases, the operations of this step may refer to, or may be performed by, an encoder as described with reference to FIG. 3.

The system uses the hidden representation 510 as an input and generates a response 515 as an output. In some cases, the operations of this step may refer to, or may be performed by, a classification network as described with reference to FIG. 3.

Training

Figure 6:
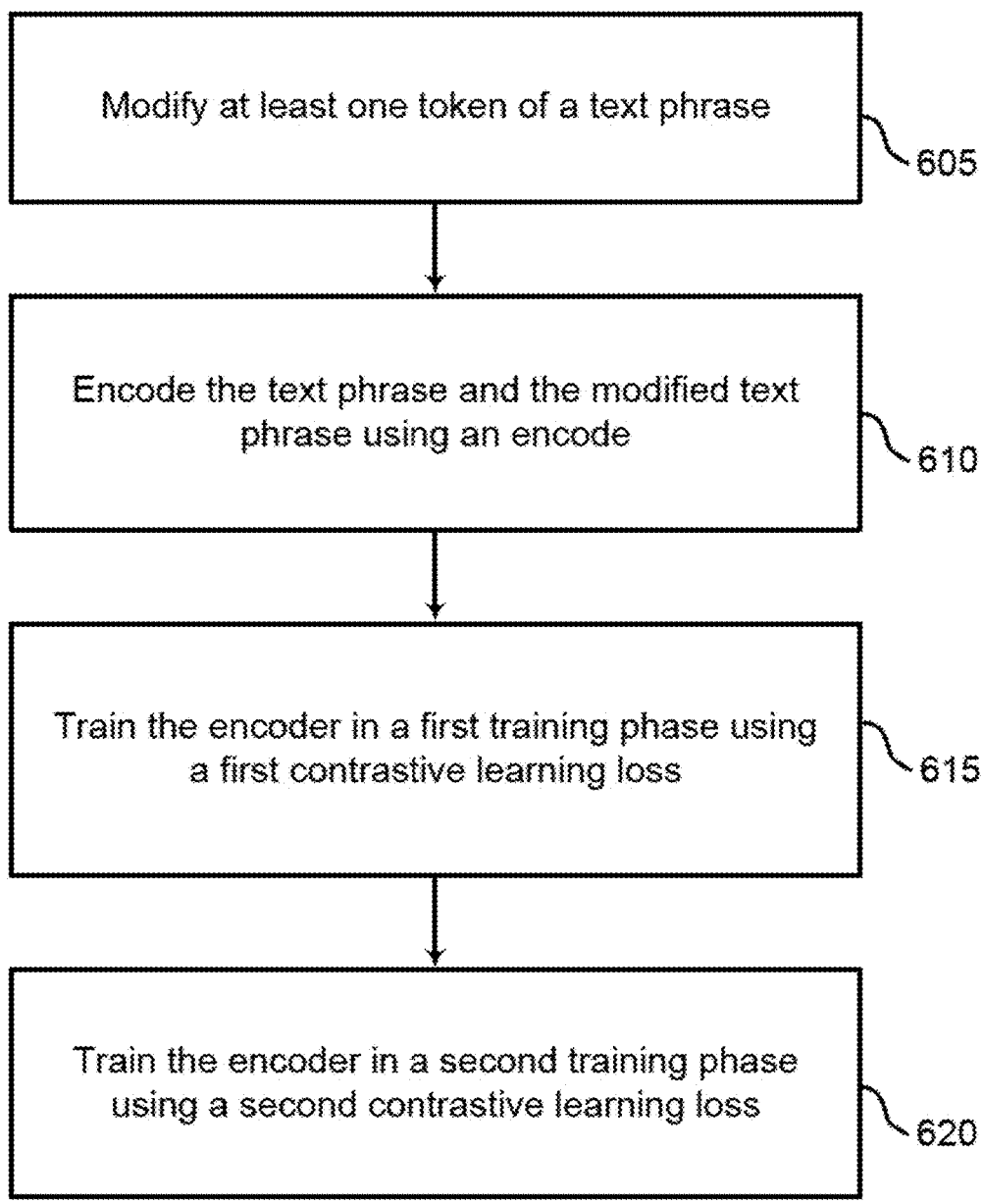
FIG. 6 shows an example of a method for training a neural network according to aspects of the present disclosure.

In FIGS. 6-7, a method for training a neural network is described. One or more aspects of the method include modifying at least one token of a text phrase to obtain a modified text phrase; encoding the text phrase and the modified text phrase using an encoder to obtain a hidden representation of the text phrase and a modified hidden representation of the modified text phrase; training the encoder in a first training phase using a first contrastive learning loss based on an unlabeled positive sample pair including the hidden representation and the modified hidden representation; and training the encoder in a second training phase using a second contrastive learning loss based on a labeled positive sample pair including a first labeled hidden representation having a ground truth label and a second labeled hidden representation having the same ground truth label.

Some examples of the method include randomly masking the at least one token. Some examples of the method further include computing a cosine similarity between the modified hidden representation and the hidden representation, where the first contrastive learning loss is based on the cosine similarity.

Some examples of the method further include selecting an unlabeled negative sample pair for the first contrastive learning loss during the first training phase, where the unlabeled negative sample pair includes the hidden representation and an additional hidden representation corresponding to an additional text phrase that is different from the text phrase. Some examples of the method further include identifying unlabeled positive sample pairs and an unlabeled negative sample pairs corresponding to each sample in a training batch during the first training phase.

Some examples of the method further include computing a probability of each modified token of the modified text phrase over a total vocabulary. Some examples further include computing a language modeling loss based on the probability, where the encoder is trained based on the language modeling loss in the first training phase. Some examples of the method further include encoding a plurality of labeled text phrases to obtain a corresponding labeled hidden representation for each of the labeled text phrases. Some examples further include predicting a label for each of the labeled text phrases using a classification network based on the corresponding labeled hidden representation. Some examples further include computing a prediction loss by comparing the predicted label and a ground truth label, where the encoder and the classification network are jointly trained in the second training phase using the prediction loss and the second contrastive learning loss.

Some examples of the method further include selecting a labeled negative sample pair for the second contrastive learning loss during the second training phase, where the labeled negative sample pair includes the first labeled hidden representation having the ground truth label and a third labeled hidden representation with a label other than the ground truth label. Some examples of the method further include identifying labeled positive sample pairs and labeled negative sample pairs corresponding to each sample in a training batch during the second training phase.

FIG. 6 shows an example of a method for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system modifies at least one token of a text phrase. In some cases, the operations of this step refer to, or may be performed by, a modification component as described with reference to FIG. 3. In some embodiments, modifying at least one token of a text phrase may be performed as described with reference to FIG. 3.

At operation 610, the system encodes the text phrase and the modified text phrase using an encoder. In some cases, the operations of this step refer to, or may be performed by, an encoder as described with reference to FIG. 3. In some embodiments, encoding the text phrase and the modified text phrase may be performed as described with reference to FIG. 1-3.

At operation 615, the system trains the encoder in a first training phase using a first contrastive learning loss. In some cases, the operations of this step refer to, or may be performed by, a pre-training component as described with reference to FIG. 3. In some embodiments, training the encoder in a first training phase may be performed as described with reference to FIGS. 3 and 7.

At operation 620, the system trains the encoder in a second training phase using a second contrastive learning loss. In some cases, the operations of this step refer to, or may be performed by, a fine-tuning component as described with reference to FIG. 3. In some embodiments, training the encoder in a second training phase may be performed as described with reference to FIGS. 3 and 7.

FIG. 7 shows an example of a two-step neural network training process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure include a few-shot intent detection process that handles C user intents, where the task is to classify a user utterance u into one of the C classes. A balanced K-shot learning is set for each intent (i.e., each intent includes K examples in the training data). As a result, there are a total of C·K training examples.

At operation 705, in stage one, the system computes a first contrastive learning loss. In some cases, the operations of this step refer to, or may be performed by, a pre-training component as described with reference to FIG. 3.

For example, one or more embodiments of the present disclosure retrieve a feature representation $h_i$ for an ith user utterance through an encoder model such as BERT; for example, $h_i$=BERT($u_i$). A self-supervised contrastive learning method is used to learn sentence-level utterance understanding and discriminate semantically similar utterances. The self-supervised contrastive learning method can be represented by the equation $$\mathcal{L}_{uns\_cl} = -\frac{1}{N}\sum_{i=1}^{N}\log\frac{\exp(sim(h_i, \overline{h}_i)/\tau)}{\sum_{j=1}^{N}\exp(sim(h_i, \overline{h}_j)/\tau)} \quad (1)$$

where N is the number of sentences in a batch, $\tau$ is a temperature parameter that controls the penalty to negative samples, $sim(h_i, \overline{h}_i)$ denotes the cosine similarity between two input vectors h; and $\overline{h}_i$, $\overline{h}_i$ represents the representation of sentence $\overline{u}_i$, where $\overline{u}_i$ is from the same sentence $u_i$ but few (10%) tokens are randomly masked. Tokens are dynamically masked during batch training, and the sentence $u_i$ and $\overline{u}_i$ are input together to a single encoder during the batch training.

At operation 710, the system computes a mask language modeling loss. In some cases, the operations of this step refer to, or may be performed by, a pre-training component as described with reference to FIG. 3. For example, one or more embodiments of the present disclosure add the mask language modeling loss to enhance the token-level utterance understanding. The mask language modeling loss can be represented by the equation $$\mathcal{L}_{mlm} = -\frac{1}{M}\sum_{m=1}^{M}\log P(x_m) \quad (2)$$

where $P(x_m)$ denotes the predicted probability of a masked token $x_m$ over the total vocabulary, and M is the number of masked tokens in each batch.

At operation 715, the system trains the network based on the first contrastive learning loss and the mask language modeling loss. In some cases, the operations of this step refer to, or may be performed by, a pre-training component as described with reference to FIG. 3. For example, the total loss for each batch is $\mathcal{L}_{stage1} = \mathcal{L}_{uns\_cl} + \lambda \mathcal{L}_{mlm}$, where $\lambda$ is a weight hyper-parameter.

At operation 720, in stage two, the system computes a second contrastive learning loss. In some cases, the operations of this step refer to, or may be performed by, a fine-tuning component as described with reference to FIG. 3.

For example, the model uses multiple unlabeled user utterances through self-supervised learning in the first stage. The model is given limited examples in the second stage (for example, five and ten for each intent). A supervised contrastive learning method trained with an intent classification loss is used to understand similar user intents. An embodiment of the disclosure treats two utterances from the same class as a positive pair and two utterances across different classes as a negative pair for contrastive learning. For example, two utterances that are same and input to a single encoder could be a positive pair. In some cases, feature representations of same utterances are different due to the dropout of BERT. The corresponding loss is given as:

$$\mathcal{L}_{s\_cl} = -\frac{1}{T} \sum_{i=1}^{N} \sum_{j=1}^{N} 1_{y_i = y_j} \log \frac{\exp(sim(h_i, h_j)/\tau)}{\sum_{n=1}^{N} \exp(sim(h_i, h_n)/\tau)} \quad (3)$$

where T is the number of pairs from the same classes in the batch.

At operation 725, the system computes an intent classification loss. In some cases, the operations of this step refer to, or may be performed by, a fine-tuning component as described with reference to FIG. 3. For example, the intent classification loss is:

$$\mathcal{L}_{intent} = -\frac{1}{N} \sum_{j=1}^{C} \sum_{i=1}^{N} \log P(C_j \mid u_i) \quad (4)$$

where $P(C_j|u_i)$ is the predicted probability of the i-th sentence to be the j-th intent class.

At operation 730, the system fine-tunes the network based on the second contrastive learning loss and the intent classification loss. In some cases, the operations of this step refer to, or may be performed by, a fine-tuning component as described with reference to FIG. 3. For example, the two losses are trained jointly at each batch: $\mathcal{L}_{stage2} = \mathcal{L}_{s\_cl} + \lambda' \mathcal{L}_{intent}$, where $\lambda'$ is a weight hyper-parameter.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of natural language processing, comprising:
   receiving a text phrase;
   encoding the text phrase using an encoder to obtain a hidden representation of the text phrase, wherein the encoder is trained during a first training phase using self-supervised learning based on a first contrastive loss and during a second training phase following the first training phase using supervised learning based on a second contrastive learning loss, wherein the first contrastive loss is based on an unlabeled positive sample pair including the hidden representation and a modified hidden representation and the second contrastive learning loss is based on a labeled positive sample pair including a first labeled hidden representation having a ground truth label and a second labeled hidden representation having the same ground truth label;
   identifying an intent of the text phrase from a predetermined set of intent labels using a classification network based on the hidden representation, wherein the classification network is jointly trained with the encoder in the second training phase; and
   generating a response to the text phrase based on the intent.

2. The method of claim 1, further comprising:
receiving an audio input; and
converting the audio input into text to obtain the text phrase.

3. The method of claim 2, further comprising:
verbally playing the response to a user in response to receiving the audio input.

4. The method of claim 1, further comprising:
determining that the text phrase comprises a request for information based on the intent; and
retrieving the information from a database based on the determination.

5. The method of claim 1, wherein:
the predetermined set of intent labels includes a plurality of semantically similar intent labels.

6. A method of training a neural network, comprising:
modifying at least one token of a text phrase to obtain a modified text phrase;
encoding the text phrase and the modified text phrase using an encoder to obtain a hidden representation of the text phrase and a modified hidden representation of the modified text phrase;
training the encoder in a first training phase using a first contrastive learning loss, wherein the first contrastive loss is based on an unlabeled positive sample pair including the hidden representation and the modified hidden representation; and
training the encoder in a second training phase following the first training phase using a second contrastive learning loss, wherein the second contrastive loss is based on a labeled positive sample pair including a first labeled hidden representation having a ground truth label and a second labeled hidden representation having the same ground truth label.

7. The method of claim 6, wherein:
modifying the at least one token comprises randomly masking the at least one token.

8. The method of claim 6, further comprising:
computing a cosine similarity between the modified hidden representation and the hidden representation, wherein the first contrastive learning loss is based on the cosine similarity.

9. The method of claim 6, further comprising:
selecting an unlabeled negative sample pair for the first contrastive learning loss during the first training phase, the unlabeled negative sample pair including the hidden representation and an additional hidden representation corresponding to an additional text phrase different from the text phrase.

10. The method of claim 6, further comprising:
identifying unlabeled positive sample pairs and an unlabeled negative sample pairs corresponding to each sample in a training batch during the first training phase.

11. The method of claim 6, further comprising:
computing a probability of each modified token of the modified text phrase over a total vocabulary; and
computing a language modeling loss based on the probability, wherein the encoder is trained based on the language modeling loss in the first training phase.

12. The method of claim 6, further comprising:
encoding a plurality of labeled text phrases to obtain a corresponding labeled hidden representation for each of the labeled text phrases;
predicting a label for each of the labeled text phrases using a classification network based on the corresponding labeled hidden representation; and
computing a prediction loss by comparing the predicted label and a ground truth label, wherein the encoder and the classification network are jointly trained in the second training phase using the prediction loss and the second contrastive learning loss.

13. The method of claim 6, further comprising:
selecting a labeled negative sample pair for the second contrastive learning loss during the second training phase, the labeled negative sample pair including the first labeled hidden representation having the ground truth label and a third labeled hidden representation with a label other than the ground truth label.

14. The method of claim 6, further comprising:
identifying labeled positive sample pairs and a labeled negative sample pairs corresponding to each sample in a training batch during the second training phase.

15. An apparatus for natural language processing, comprising:
an encoder configured to encode a text phrase to obtain a hidden representation;
a classification network configured to predict a label for the text phrase network based on the hidden representation;
a pre-training component configured to train the encoder in a first training phase using a first contrastive learning loss, wherein the first contrastive learning loss is based on an unlabeled positive sample pair including the hidden representation and a modified hidden representation; and
a fine-tuning component configured to train the encoder in a second training phase following the first training phase using a second contrastive learning loss, wherein the second contrastive learning loss is based on a labeled positive sample pair including a first labeled hidden representation with a ground truth label and a second labeled hidden representation having the same ground truth label.

16. The apparatus of claim 15, further comprising:
a modification component configured to mask at least one token of the text phrase to produce a modified text phrase, where in the modified hidden representation is based on the modified text phrase.

17. The apparatus of claim 15, wherein:
the pre-training component is configured to compute a probability of each modified token of the modified text phrase over a total vocabulary, and to compute a language modeling loss based on the probability, wherein the encoder is trained based on the language modeling loss in the first training phase.

18. The apparatus of claim 15, wherein:
the fine-tuning component is configured to identify labeled positive sample pairs and a labeled negative sample pairs corresponding to each sample of a training batch.

19. The apparatus of claim 15, wherein:
the fine-tuning component is configured to compute a prediction loss by comparing the predicted label to a ground truth label.

20. The apparatus of claim 15, wherein:
the encoder is based on a pre-trained Bidirectional Encoder Representations from Transformers (BERT) model.

* * * * *